Nov. 17, 1959 C. R. KILLIAN 2,913,032
TIRE TREAD
Filed June 17, 1958

Claud R. Killian
INVENTOR

United States Patent Office 2,913,032
Patented Nov. 17, 1959

2,913,032
TIRE TREAD
Claud R. Killian, Hayesville, N.C.
Application June 17, 1958, Serial No. 742,589
2 Claims. (Cl. 152—209)

The present invention generally relates to novel structural arrangements in tire treads and more particularly tire treads incorporating structural features for giving positive traction on substances normally having very little traction such as on ice or similar slick surfaces.

The primary object of the present invention is to provide a tire tread having a novel suction cup construction disposed in spaced relation throughout the periphery of the tire for gripping normally slick surfaces by the employment of a temporarily induced suction thus providing traction for tires on slick surfaces.

A further object of the present invention is to provide a tire tread for grippingly engaging icy surfaces which is extremely simple in construction, effective for its particular purposes and relatively inexpensive to manufacture.

Figure 1:
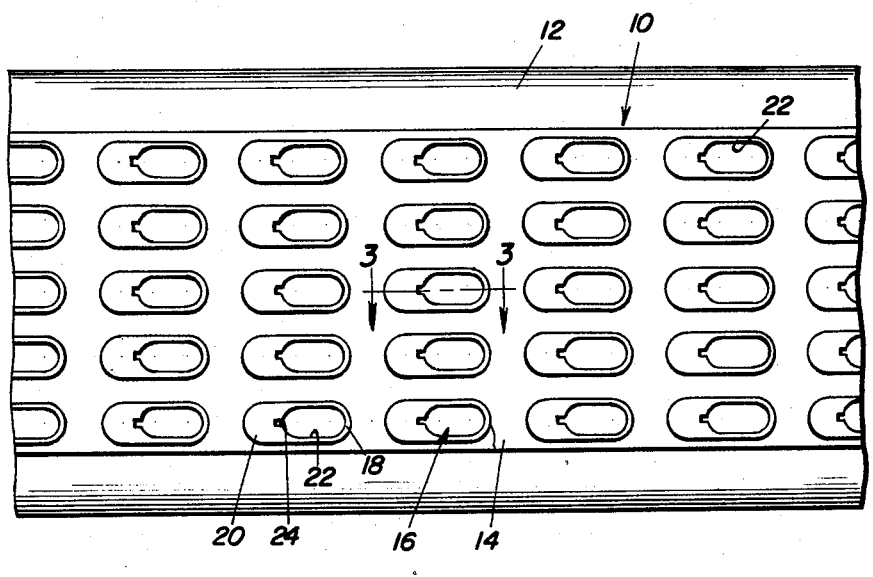
Figures 2, 3:
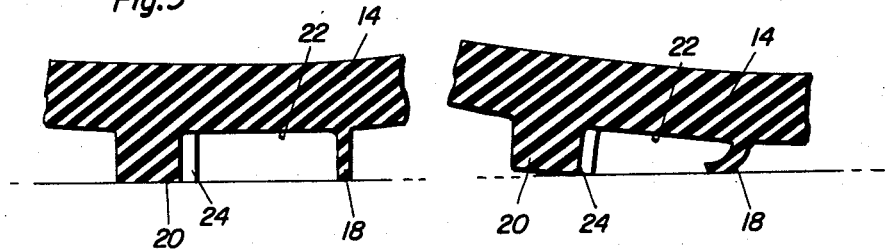

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a plan view of a portion of a tire with the tire tread of the present invention incorporated therein;

Figure 2 is a sectional view illustrating one part of the tire tread in which the vacuum cup is partially collapsed for expelling air from the vacuum cup; and Figure 3 is a sectional view taken substantially upon a plane passing along section line 3—3 of Figure 1 illustrating the construction of the vacuum cup after the vacuum has been induced therein by raising the vacuum cup away from the supporting surface after the air has been expelled from the vacuum cup for inducing a vacuum therein.

Referring now specifically to the drawings, the numeral 10 generally designates the tire tread 10 which is mounted on a tire casing 12 which may be of any conventional type. The base of the tire tread 10 is designated by the numeral 14 and includes a sheet of rubber or similar material that is normally employed in pneumatic tire structure.

Mounted integral with the tire tread base 14 is a plurality of suction devices generally designated by the numeral 16 which is in the form of a suction cup which is oval shaped in configuration and includes a relatively thin or weakened leading edge 18 and a thickened or stronger trailing edge 20. The terms leading and trailing are in relation to the portion of the suction cup 16 which engages the icy surface first.

In Figure 2 there is illustrated the orientation of the suction cup during initial rotational movement of the wheel in which the leading edge 18 has come into contact with the supporting surface and due to its flexibility the leading edge will be collapsed downwardly thus dispelling air from the area confined by the leading edge 18 and the trailing edge 20 which are continuous and define generally an oval shaped hollow area 22 from which the air is exhausted when the leading edge 18 collapses as illustrated in Figure 2. When the leading edge 18 collapses during normal rotation of the tire, the air in the pocket 22 will be expelled.

After this, the tire tread rotates further and the thickened or strong trailing edge 20 will engage the supporting surface and will support the entire weight of the tire and whatever is supported by the tire so that the base 14 of the tire tread may assume a position generally concentric with the tire. Due to the movement of the base 14 from the position illustrated in Figure 2 to the position illustrated in Figure 3, the air having been exhausted from the pocket 22, the suction will be produced in the pocket 22 thus locking the pocket 22 to the supporting surface for preventing slippage therebetween.

The thickened trailing edge 20 is provided with a vertical groove 24 therein for assuring that the air will be expelled from the pocket thus assuring minimum room for air.

As the full weight of the loads being supported comes down on the cup it is somewhat flattened or compressed and the air is expelled therefrom. As the leading edge of the suction cup receives the major portion of the load during rotation of the wheel, the air is expelled by virtue of its passage through the groove 24. The edges of the cup are then sealed especially in moist icy conditions while the cup is in somewhat of a flattened condition with less air than it would hold due to the sealing off of the groove 24 while the peripheral edge of the cup 22 is still partially flattened as shown in Figure 2. Then, as rotation continues, the relatively stiff and strong trailing edge 20 raises the flattened cup thus creating a suction or reduced pressure area within the cup 22 so that the peripheral edges of the cup 22 defined by the leading edge 18 and trailing edge 20 will effectively grip an icy or slippery surface. The arrangement of the suction cup devices may be varied as desired and may be in transverse alignment as shown or may be in staggered relation for purposes of assuring a positive and continuous grip on a supporting surface. The tread may be constructed of any suitable material such as the rubber normally used in the construction of automobile tires or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a pneumatic tire having a tread thereon including a resilient peripheral base, a plurality of radially projecting suction cups formed integrally with said base for grippingly engaging a slippery supporting surface, each of said suction cups including an oval shaped cup having a major axis parallel to the path of movement of the tread, said cup being defined by a relatively thin leading edge and a relatively thick trailing edge whereby the leading edge will be collapsed during initial contact with the supporting surface during rotation of the tire for expelling air therefrom with the trailing edge lifting the suction cup during subsequent movement of rotation thus lifting the suction cup and creating a vacuum within the suction cup thus sealing the leading and trailing edges of the suction cup to the supporting surface for gripping the same.

2. The combination of claim 1 wherein the relatively thick trailing edge is provided with a vertical groove communicating the outer surface of the trailing edge with the interior of the cup for providing a path for expelling the air from the suction cup during the initial collapsing of the leading edge.

References Cited in the file of this patent

UNITED STATES PATENTS 1,127,789    McCoy _____ Feb. 9, 1915

FOREIGN PATENTS 888,055    Germany _____ Feb. 8, 1954